Figure 1:
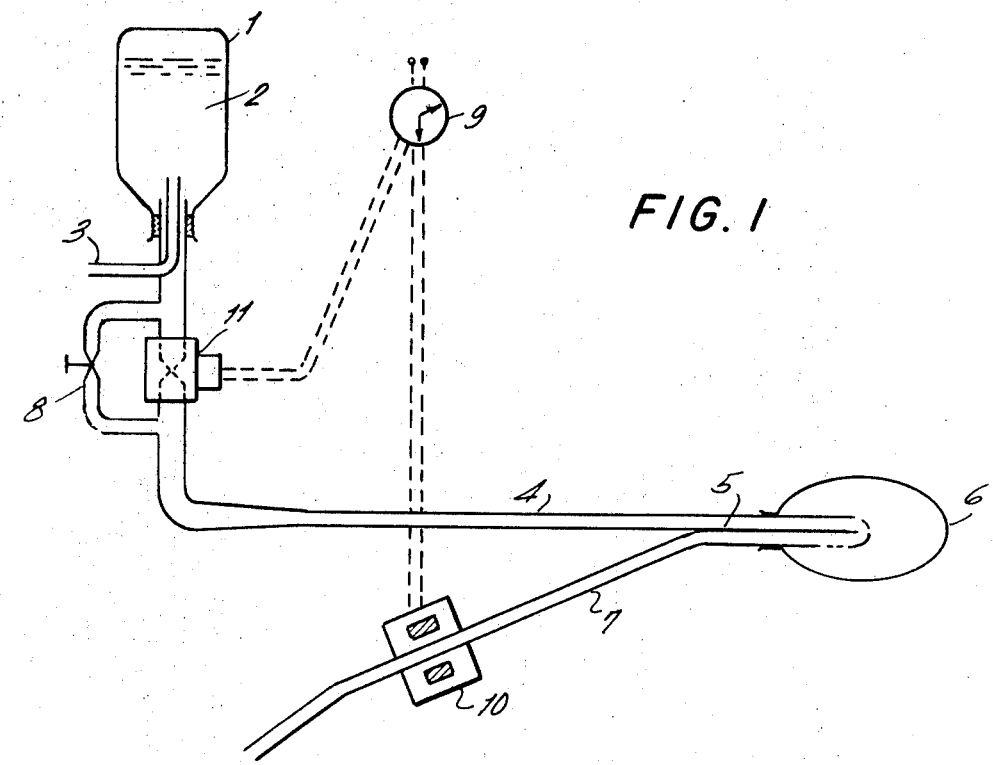

United States Patent

[11] 3,570,488

[72] Inventors Mordechai Diskin
Haifa;
Amnon David, Ramat-Gan, Israel
[21] Appl. No. 823,780
[22] Filed May 12, 1969
Continuation-in-part of Ser. No. 588,643,
Oct. 5, 1966, Pat. No. 3,481,334
[45] Patented Mar. 16, 1971
[73] Assignee Technion Research & Development
Foundation Limited

[54] AUTOMATIC APPARATUS FOR URINARY
BLADDER IRRIGATION
4 Claims, 2 Drawing Figs.
[52] U.S. Cl. .................................................. 128/230,
128/227, 128/240
[51] Int. Cl. ..................................................... A61m 1/00
[50] Field of Search ........................................ 128/227,
230, 240, 214, 213, 349, 350

[56] References Cited
UNITED STATES PATENTS
| | | | |
|---|---|---|---|
| 2,629,399 | 2/1953 | Kulick.......................... | 128/227 |
| 3,185,153 | 5/1965 | Leucci.......................... | 128/227 |
| 3,329,147 | 7/1967 | Barron ......................... | 128/230 |
| 3,410,268 | 11/1968 | Leucci.......................... | 128/227 |

Primary Examiner—Richard A. Gaudet
Assistant Examiner—Ronald L. Frinks
Attorneys—Bierman and Bierman and Jordan B. Bierman ABSTRACT: An apparatus for the automatic irrigation of urinary bladders includes a means to cycle the inflation, deflation and flushing of the bladder. The apparatus includes a supply vessel, two flow control valves, a supply tube with a bladder catheter and timing means to control one of the flow control valves. A pump, controlled by the timing means, may also be used.

Patented March 16, 1971     3,570,488

INVENTORS
MORDECHAI HAIM DISKIN
AMNON DAVID
BY
Bierman & Bierman
ATTORNEYS

AUTOMATIC APPARATUS FOR URINARY BLADDER IRRIGATION

This application is a continuation-in-part application based upon the applicants' prior application Ser. No. 588,643 entitled "Apparatus for Urinary Bladder Irrigation," and filed Oct. 5, 1966, now U.S. Pat. No. 3,481,334.

This invention relates to an apparatus for urinary bladder irrigation.

It is the object of the invention to provide an apparatus for the automatic irrigation of urinary bladders. This irrigation consists of the automatic performance of one or more cycles consisting of the steps of inflation, deflation, and flushing of the urinary bladder with a solution prescribed for this purpose, without requiring attendance of an operator, except to initially set up and start the apparatus' action.

Previous medical practice has been to perform all operations for flushing, inflation and deflation of urinary bladders manually, by adjusting the setting of a restriction valve in a inlet tube conducting the solution used for flushing into a catheter inserted into the bladder, and by adjusting the setting of another similar valve in a discharge tube connected to the catheter for conducting the solution out of the bladder.

The first type of irrigation cycle in current practice consists of the following three steps:

1.A A steady flushing of the urinary bladder at a low rate of flow of flushing solution, that does not cause any inflation of the bladder. This part of the irrigation cycle is of a relatively long time duration.

1.B The relatively rapid inflation of the urinary bladder by charging fluid into it at a flow rate considerably greater than the rate in step (1.A). The inflation during this part of the cycle is terminated after a certain desired period of time, or when the pressure in the bladder reaches a predetermined value.

1.C The rapid deflation of the bladder (all references to "-bladder" henceforth will mean "urinary bladder") by permitting it to be emptied of the fluid which it contains. During this deflation, inflow to the bladder is resumed at a rate equal to that in step (1.A).

This step ends when the bladder is deflated, and the end of this step completes the cycle.

The cycle is with step (1.A).

A second type of irrigation cycle in current practice consists of the following two steps: 2.A A steady inflation of the bladder by charging it with flushing solution at a constant small rate of flow over a relatively long period of time. The inflation terminates after a certain desired period of time, or when the bladder pressure reaches a predetermined value.

2.B Rapid deflation of the bladder by permitting the emptying out of the fluid it contains. During deflation, The steady inflow of flushing solution is maintained at the flow rate of step (2.A). The deflation step is terminated after a certain desired period of time or when the bladder is deflated. The end of this step completes the cycle.

The cycle is resumed with step (2.A).

The requirements of the first cycle, steps 1. A, B and C, are such that in previous practice the cycle was not performed automatically, but required operation by an operator.

Regarding the operations of the second cycle—steps (2.A) and (2.B)—these were usually also carried out manually. One technique in previous practice for accomplishing the cycle automatically was by using a siphon tube after the outlet tube of the catheter was inserted into the bladder. The siphon is primed when the pressure in the bladder is sufficiently great to force liquid up the leg of the siphon and over into the drain (or outlet) leg of the siphon. This device, used in previous practice, is thus responsive to pressure in the bladder to either permit steady inflation of the bladder (2.A), (2.A) or rapid deflation (2.B). According to this previous device, the length of time the inflation and deflation steps persist are not independently set variables. In addition, using this previous technique, the operator must make a manual adjustment of the flow rate(s) desired.

In order to perform the above-described cycles, any apparatus used for irrigating bladders should have incorporated into it—at the very least—means for varying the flow rate(s) of the flushing solution into the bladder, and means for varying the duration of time of each step of the cycle. Additionally, it should be provided with means for sensing and indicating pressure in the bladder, and means for terminating the inflation steps of the cycle, when bladder pressure reaches a predetermined value. Finally, it is highly desired that the above-described cycles be performed automatically in order not to require the attendance of an operator to perform the bladder irrigation cycles.

The advantages claimed for one or more of the forms of the apparatus of this invention, to be described more fully in the following section, are:

1. It provides for the automatic irrigation flushing, inflation and deflection—of bladders according to a predetermined cycle based upon time and/or bladder pressure.

2. The rate of flushing, the rate of inflation, and the length of the steps in the cycle(s) can be set to any predetermined values, within the limitations set by the apparatus size, depending upon the needs of the individual patient. Flow rates, and lengths of time for each of the steps can be changed conveniently during the treatment process if this is indicated.

3. The apparatus is provided with a means for indicating bladder pressure and includes means for terminating bladder inflation as soon as a predetermined pressure is obtained.

4. The apparatus makes use of a closed system of sterilized piping from the supply bottle to the bladder. This greatly reduces the danger of infection. The system piping and catheter can be sterilized on their own. The pump(s) and valve(s) are external to the piping and do not constitute a source of contamination for the flushing solution.

Figure 2:
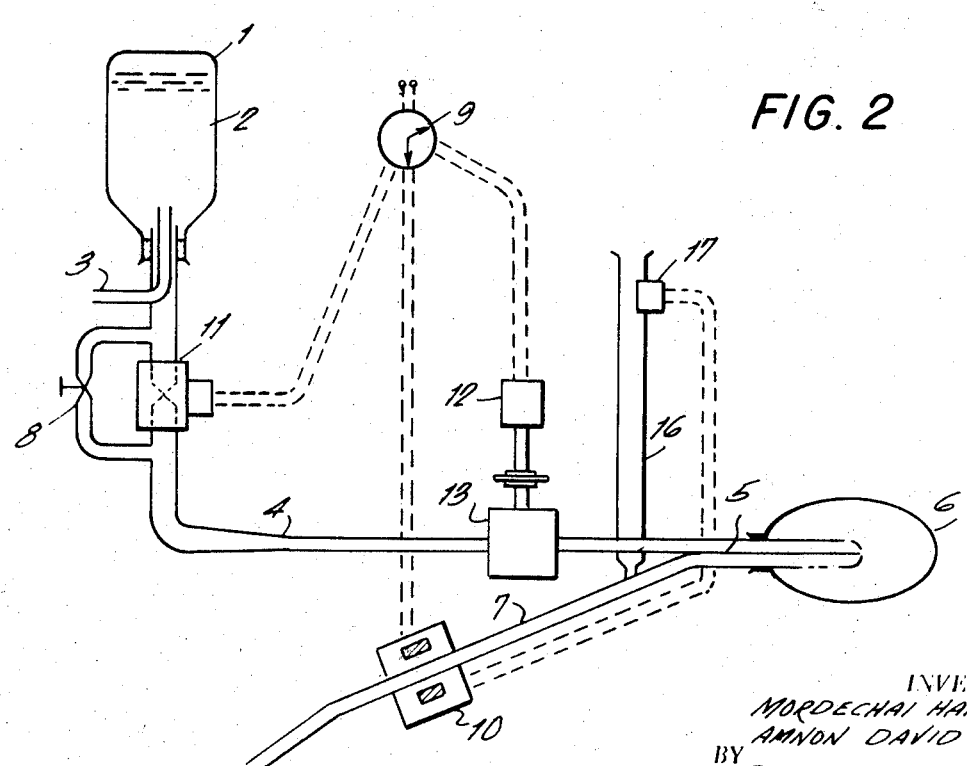

The invention is illustrated, in several of its modifications, given by way of example in its application to urinary bladder irrigation, in the accompanying drawings, in which:

FIG. 1 is a schematic drawing showing the arrangement of the elements of the apparatus which utilizes gravity flow of the irrigating fluid, but having a choice of two flow rates; and FIG. 2 is a schematic drawing showing the arrangement of the elements of the apparatus which utilize a pump to circulate the irrigating fluid.

The urinary bladder irrigation apparatus illustrated in FIG. 1 comprises a container 1 for supplying the irrigation fluid 2 to the irrigation system, which container has provided to it an air inlet 3 permitting the irrigation fluid to flow under the action of gravity, through the flow rate regulating valve 8, the catheter supply tube 4, the inlet tube of catheter 5, the urinary bladder 6, the outlet tube of catheter 5, and the discharge tube 7. The flow rate is determined by the setting of the valve 8. The irrigation cycle may be partly controlled by the outlet flow control 10, which receives its commands from a timing device 9.

The outlet flow control 10 may be one of a number of broad classes of devices used to control flow. For example, it could be constructed of a simple electric solenoid clamp that either firmly grips the discharge tube 7 (which in this case should be of a flexible material such as plastic tubing), thus preventing flow, or, when the solenoid clamp is not actuated, the tube 7 permits free flow of fluid through itself.

The outlet flow control device 10 could be a solenoid-operated valve which is either opened or closed to permit or prevent flow. The outlet flow control device could also be a hydraulic valve either opened or closed, obtaining command power electrically, pneumatically, or hydraulically, for example.

The timing device 9 could be, for example, an electrically driven clock having a set of timing cams or contacts to open and close according to the cycle of irrigation desired. The timing device need not be electrically operated. It could be based on mechanical, hydraulic, pneumatic or other means of timing, with provision for providing a command to the outlet flow control device 10.

In addition, a second flow rate regulating valve 11 is used in parallel with the first flow regulating valve 8. This permits the establishment of two independent rates of flow. For example, in initially adjusting the apparatus for the desired low flow rate flushing (which does not cause inflation of the bladder), valve 11 is maintained in its closed position, and outlet control 10 is not energized. The desired low rate of flow is obtained by adjusting the flow regulating valve 8. When timer 9 gives the valve 11, which has been previously set to the higher rate of flow, a command to open, and at the same time closes the outlet control 10, the inflation part of the irrigation cycle commences.

Irrigating fluid 2 from the container 1 will now flow at a relatively high rate, through valve 11, the catheter supply tube 4, the catheter 5, and into the bladder 6. The bladder will then begin to inflate as irrigating fluid is forced into it. After a sufficient period of time, the timer 9 acts to deenergize both valve 11 (which closes), and outlet flow control 10 (which opens). The low flow rate flushing mode of operation is thus reestablished.

FIG. 2 shows an apparatus for irrigating bladders in which the pressure for driving the irrigation solution through the system is provided by a pump 13 driven by motor 12. In general, the pump may be set to deliver a relatively high flow rate. During flushing the rate pump 13 would deliver irrigating solution to the bladder, or simply permit such flow due to gravity. For this part of the cycle, outlet flow control 10 would be open permitting discharge of fluid out through the discharge tube 7. For rapid inflation of the bladder, the high flow rate of pump 13 is used. The pump 13 is controlled from timing device 9 which, for the inflation part of the cycle also closes outlet flow control 10, thus permitting the irrigating fluid to be forced into the bladder 6, causing it to inflate, since the fluid is now without any outlet. To return to the flushing part of the cycle, timer 9 would act to deenergize outlet flow control 10, and at the same time would switch out the high flow rate pump 13.

A suitable pump for the application is a positive displacement pump. One such pump, the "Sigma" pump (manufactured by the Sigma Pump Co., U.S.A.) is excellently suited to the bladder irrigating devices of this invention.

In operation, the pump moves a series of "fingers" up and down over the supply tube in what is called peristaltic action. The supply tube 4 would have to be made in this case of flexible material (such as plastic or rubber tubing). An important advantage is obtained, since the irrigating solution never comes into contact with matter outside the sterilized supply bottle, tubing 4, catheter 5, discharge tube 7, and the bladder 6. Thus, all parts of the system other than the bladder coming into contact with the irrigating solution can be sterilized. The pump 13 circulates the solution without contacting the solution, and is thus no source of contamination.

A piezometric tube 16 is shown connected to the discharge tube 7. The height to which liquid will stand in this tube is directly proportional to the pressure existing in the bladder. Further, since tube 16 is open to the atmosphere at its upper end, it acts as a safety device. If bladder pressure—for any reason whatsoever—is permitted to rise unchecked liquid will overflow the open top without permitting the pressure to rise to dangerous levels. (This is particularly important when the apparatus uses pumps or other mechanical means, capable of exerting very high pressure, for forcing the irrigating solution through the system).

The piezometric tube 16 of FIG. 2 is shown with a liquid level detection device 17 attached, whose purpose is to react to an excessive rise of solution level in the tube 16. (This condition occurring when pressure in the bladder is too high.) When excessive pressure occurs, liquid level detection device 17 acts to deenergize outlet flow control 10, and thus fluid from bladder 6 will be permitted to flow out rapidly, thus relieving excessive pressure and preventing further inflation of the bladder. The liquid level detection device could be in the form of electrodes that permit a current to pass through them when they are covered by the irrigating solution. Other forms of liquid level detectors are, for example, a photoelectric relay or float operated switch. In place of the piezometric tube 16, a Bourdon tube type or other type pressure gauge may also be used to indicate bladder pressure. Equipped with a set of contacts that operate when a certain pressure is reached, this "-pressurstat," by opening a set of contacts, deenergizes the outlet flow control 10 when bladder pressure gets too high.

We claim:

1. An apparatus for urinary bladder irrigation comprising in combination: a vessel containing a solution for irrigating the bladder, a first restrictive-type flow control means having its inlet connected to the outlet of the vessel, a supply tube carrying the irrigating solution, whose inlet is connected to the outlet of the flow control means, a catheter having an inlet tube and an outlet connection for respectively feeding and discharging the irrigating solution to the bladder, said inlet tube being connected to the outlet of the supply tube, a discharge tube whose inlet is connected to the outlet connection of the catheter, an outlet flow control means for blocking or permitting flow in the discharge tube, a timing means for operating the outlet flow control means according to a predetermined cycle of operations, a second restrictive type flow control means connected in parallel with the said first restrictive flow control means, said second restrictive flow control means is being connected to and operated automatically by command from the said timing means, according to a predetermined cycle.

2. An apparatus as described in claim 1 in which said second restrictive flow control device is of a two-position type, operated automatically by command from the timing means of the apparatus of claim 1, in which the first position of said second flow control valve blocks flow therethrough, and the second position permits a high rate of flow of the irrigating fluid, according to a predetermined cycle of operations.

3. An apparatus as described in claim 1 having, in addition, a power source, a pump inserted between the catheter inlet tube and the first restrictive flow control means, which pump is driven from said power source energized by the timing means of the apparatus according to a predetermined cycle of operations.

4. An apparatus according to claim 3 which has, in addition, a bladder pressure sensing means which acts to control the outlet flow control means, which pressure sensing means acts to ensure a free flow condition of the outlet flow control means when a certain predetermined pressure is obtained within the bladder.